(12) United States Patent
Clements et al.

(10) Patent No.: US 9,383,056 B2
(45) Date of Patent: Jul. 5, 2016

(54) SHEATH PROTECTION

(71) Applicant: GE Oil & Gas UK Limited, Bristol (GB)

(72) Inventors: Richard Clements, Durham (GB); Fabio de Souza Pires, Rio de Janeiro (BR); Judimar de Assis Clevelario, Rio de Janeiro (BR)

(73) Assignee: GE OIL & GAS UK LIMITED, Bristol (GB)

( * ) Notice: Subject to any disclaimer, the term of this patent is extended or adjusted under 35 U.S.C. 154(b) by 170 days.

(21) Appl. No.: 14/108,807

(22) Filed: Dec. 17, 2013

(65) Prior Publication Data

US 2014/0166146 A1    Jun. 19, 2014

(30) Foreign Application Priority Data

Dec. 18, 2012  (EP) .................................... 12197849

(51) Int. Cl.
| | | |
|---|---|---|
| *F16L 57/00* | (2006.01) | |
| *F16L 57/06* | (2006.01) | |
| *F16L 1/12* | (2006.01) | |
| *F16L 11/10* | (2006.01) | |

(52) U.S. Cl.
CPC .................. *F16L 57/00* (2013.01); *F16L 1/123* (2013.01); *F16L 11/10* (2013.01); *F16L 57/005* (2013.01); *F16L 57/06* (2013.01)

(58) Field of Classification Search
CPC ........ F16L 57/06; H02G 9/065; H02G 15/18; E21B 17/10
USPC .................. 138/110, 137, 140, 141, 151, 156; 174/19
See application file for complete search history.

(56) References Cited

U.S. PATENT DOCUMENTS

| | | | | |
|---|---|---|---|---|
| 4,929,478 A | * | 5/1990 | Conaghan et al. | 428/35.1 |
| 5,413,149 A | * | 5/1995 | Ford et al. | 138/123 |
| 6,341,626 B1 | * | 1/2002 | Davenport et al. | 138/110 |
| 6,491,067 B1 | * | 12/2002 | Davenport et al. | 138/110 |
| 6,494,496 B1 | | 12/2002 | Sweeney | |
| 7,241,482 B2 | * | 7/2007 | Ferrand | 428/40.1 |

(Continued)

FOREIGN PATENT DOCUMENTS

| | | |
|---|---|---|
| WO | WO 2011/120525 | 10/2011 |
| WO | WO 2011/154676 | 12/2011 |

OTHER PUBLICATIONS

European Search Report as mailed on Mar. 28, 2013 in EP Application No. 12197849.8.

(Continued)

*Primary Examiner* — Patrick F Brinson
(74) *Attorney, Agent, or Firm* — Knobbe Martens Olson and Bear LLP (57) ABSTRACT

An apparatus and method are disclosed for protecting an outer layer of a flexible pipe. The apparatus includes a protective sleeve body comprising a first end region and a further end region. At least one connector element is also provided which is securable to the first end region of the sleeve body for securing the sleeve body with respect to a flexible pipe located proximate to a wear hazard. The sleeve body is securable uncovered over a portion of an outer sheath of the flexible pipe between the outer sheath and the wear hazard to provide a protected portion of flexible pipe having a bending stiffness substantially equal to a bending stiffness of a remaining portion of the flexible pipe which is uncovered by the sleeve body.

18 Claims, 9 Drawing Sheets

(56) References Cited

U.S. PATENT DOCUMENTS

| | | | |
|---|---|---|---|
| 7,325,575 B1* | 2/2008 | O'Donnell et al. | 138/110 |
| 2002/0170727 A1 | 11/2002 | Holland et al. | |
| 2006/0159521 A1 | 7/2006 | Streiff et al. | |
| 2008/0135119 A1* | 6/2008 | Tonooka et al. | 138/110 |
| 2010/0068986 A1 | 3/2010 | Eccleston | |
| 2011/0006515 A1 | 1/2011 | Yanik et al. | |
| 2013/0315672 A1* | 11/2013 | Pajak et al. | 405/157 |

OTHER PUBLICATIONS

Galletly, Diana A., "Bistable composite slit tubes. I. A beam model." International Journal of Solids and Structures, Apr. 15, 2004.

\* cited by examiner

SHEATH PROTECTION

BACKGROUND

The present invention relates to a method and apparatus for protecting a flexible pipe. In particular, but not exclusively, the present invention relates to the location of a protective sleeve over an outer layer of a flexible pipe whereby a portion of flexible pipe covered by the sleeve is protected to prevent an adjacent wear hazard from damaging the outer layer as the wear hazard and flexible pipe rub together.

Traditionally flexible pipe has been utilised to transport production fluids, such as oil and/or gas and/or water from one location to another. Flexible pipe has been found to be useful in connecting a sub-sea location to a sea-level location. Flexible pipe has generally been formed as an assembly of flexible pipe body and one or more end fittings. The pipe body is conventionally formed as a combination of layered materials that form a pressure-containing conduit. The pipe structure allows large deflections in use without causing bending stresses that impair the pipe's functionality over its lifetime. The pipe body is generally built up as a combined structure including tubular metallic and polymer layers which are typically unbonded.

Such unbonded flexible pipes have been used for deep water (less than 3300 feet (1005.84 meters)) and ultra-deep water (greater than 3300 feet (1005.84 meters)) developments. Of course flexible pipe may also be used for shallow water applications (for example, less than around 500 meters depth) or even for on-shore (overland) applications.

From time to time it is known that flexible pipes are located on or adjacent to a wear hazard. That is to say, the flexible pipes may be located at a location where an outer surface (typically referred to as an outer sheath) of a flexible pipe will tend to rub or knock against a nearby object. For example, the wear hazard may be a rocky seabed or a riser touchdown location or clash area or pipeline crossing zone or contact surface on a buoyancy element. A wear hazard is also generated where a jumper is laid on a Mid Water Arch (MWA) and a friction collar used to withstand axial loads and isolate goosenecks from service loads generated by movement of a Floating Production Storage and Offloading (FPSO) system. Although almost no axial relative displacement will happen due to the presence of the friction collar, significant relative displacements may happen due to sideways movement of the FPSO and the floating device as well as the effects of current that may drag lines. This relative displacement may cause the flexible riser outer sheath to breach after significant rubbing. This could potentially expose tensile armour wires to a direct contact situation with a MWA pontoon which will not be covered with any sort of polymeric sheath but rather may merely be painted with a few millimeters of epoxy-based paint.

A solution for this problem has been to include an additional sacrificial layer outside an outer sheath of a flexible pipe along the whole length of the pipe. However, such a solution introduces an increased stiffness and cost to the manufacture of flexible pipe.

It is an aim of the present invention to at least partly mitigate the above-mentioned problems.

It is an aim of certain embodiments of the present invention to provide a localised solution to problems caused to a flexible pipe by an adjacent wear hazard.

It is an aim of certain embodiments of the present invention to provide an apparatus and method for protecting an outer layer of a flexible pipe.

It is an aim of certain embodiments of the present invention to provide a method and apparatus for protecting an outer sheath of a flexible pipe in a way that can be retro-fitted to an in-situ flexible pipe.

It is an aim of certain embodiments of the present invention to provide a solution that can be easily and rapidly fitted and, if necessary, replaceable.

SUMMARY

According to a first aspect of the present invention there is provided apparatus for protecting an outer layer of a flexible pipe, comprising:
- a protective sleeve body comprising a first end region and a further end region; and
- at least one connector element securable to the first end region for securing the sleeve body with respect to a flexible pipe located proximate to a wear hazard; wherein
- the sleeve body is securable uncovered over a portion of an outer sheath of the flexible pipe between said outer sheath and said wear hazard, to provide a protected portion of flexible pipe having a bending stiffness substantially equal to a bending stiffness of a remaining portion of the flexible pipe uncovered by said sleeve body.

Aptly, an outer surface and an inner surface of the sleeve body is substantially smooth and cylindrical.

Aptly, the sleeve body is a unitary element having a common cross-sectional thickness and stiffness and substantially circular cross-section along a whole length of the sleeve body.

Aptly, an opening extends through the sleeve body between a first and further end of the sleeve body.

Aptly, the connector element is an intermediate connector connectable to a friction clamp secured to the flexible pipe.

Aptly, the sleeve body comprises a single sacrificial layer of a material that abrades before the outer sheath is abraded as the flexible pipe is axially or laterally displaced with respect to the sleeve body.

Aptly, the sacrificial layer is a polymeric layer.

Aptly, the sleeve body is a single layer of wear resistant material that resists abrasion by the wear hazard when the flexible pipe is repeatedly urged against the wear hazard.

Aptly, the material of the wear resistant layer has a composite construction.

Aptly, the protective sleeve body is a multi-layer body comprising an inner sacrificial layer, that abrades before the outer sheath is abraded as the flexible pipe is axially or laterally displaced with respect to the sleeve body, and an outer wear resistant layer that resists abrasion by the wear hazard when the flexible pipe is repeatedly urged against the wear hazard.

Aptly, the sleeve body is a strip of bi-stable material.

Aptly, the strip has a first state in which the material is curled about a rolling axis perpendicular to a longitudinal axis of the strip and a further state in which the material is wrapped around a clamping axis substantially parallel with the longitudinal axis.

Aptly, the sleeve body is selectively extendable into the further state in which the strip is wrapped circumferentially around the pipe.

Aptly, the flexible pipe is a riser or jumper.

Aptly, the wear hazard is a rocky seabed or riser touchdown location or clash area or pipeline crossing zone or contact surface of a buoyancy member.

According to a second aspect of the present invention there is provided a method of protecting an outer layer of a flexible pipe, comprising the steps of:

via a protective sleeve body secured uncovered over a portion of an outer sheath of a flexible pipe located proximate to a wear hazard, providing a protected portion of flexible pipe where the sleeve body is located between the outer sheath and the wear hazard, said protected portion having a bending stiffness substantially equal to a bending stiffness of a remaining portion of the flexible pipe uncovered by said sleeve body.

Aptly, the method further comprises the steps of:

providing a protective sleeve body over said a portion of the outer sheath of the flexible pipe between the outer sheath and said wear hazard; and via at least one connector element, securing the sleeve body with respect to the flexible pipe.

Aptly, the step of securing the sleeve body comprises the step of securing an intermediate connector element to a friction clamp secured to the flexible pipe and securing the sleeve body to the intermediate connector element.

Aptly, the method further comprises, as the flexible pipe is axially or laterally displaced with respect to the sleeve body, abrading material of the sleeve body before the outer sheath is abraded.

Aptly, the method further comprises the step of, as the flexible pipe is repeatedly urged against the wear hazard, abrading material of the sleeve body before the outer sheath is abraded.

Aptly, the step of providing a protective sleeve body comprises the step of, providing a multi-layer sleeve body comprising at least an inner sacrificial layer and an outer wear resistant layer.

Aptly, the step of providing a protective sleeve body comprises the step of:

sliding a substantially cylindrical elongate sleeve body having a substantially smooth inner and outer surface along the flexible pipe to cover said a portion of the outer sheath.

Aptly, the step of providing a protective sleeve body comprises the steps of:

widening an opening that extends between ends of the sleeve body;

urging the pipe through the opening; and closing the opening thereby locating the sleeve body around the outer sheath.

Aptly, the step of providing a protective sleeve body comprises the step of:

locating a bi-stable body in an extended state in which at least a portion of the bi-stable body is wrapped circumferentially around said a portion of the outer sheath.

Aptly, the method further comprises the step of retro-fitting the sleeve body to an in-situ flexible pipe.

According to a third aspect of the present invention there is provided apparatus constructed and arranged substantially as hereinbefore described with reference to the accompanying drawings.

According to a fourth aspect of the present invention there is provided a method substantially as hereinbefore described with reference to the accompanying drawings.

Certain embodiments of the present invention provide a modular and local solution for wear-related problems associated with flexible risers installed in mid-water floating devices such as MWAs with no impact to the design of the flexible pipe structure.

Certain embodiments of the present invention provide a protected portion of a pipe where needed but avoid the need for use of additional sacrificial layers along a whole length of a flexible pipe which would otherwise have an impact on the bending stiffness of the structure and to overall costs.

Certain embodiments of the present invention utilise bi-stable composite technology which permits the retro-fitting of a wear resistant sleeve to flexible pipes already in service with a minimal amount of intervention being needed to the system.

Certain embodiments of the present invention make use of a dual-layer system for the manufacture of a protective sleeve to allow the protection of a flexible pipe's outer sheath with the use of a soft material in an innermost layer and the use of a wear resistant material on an outer surface. This enables materials to be selected that best suits the interface between sleeve and outer sheath and sleeve and adjacent wear hazard.

DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
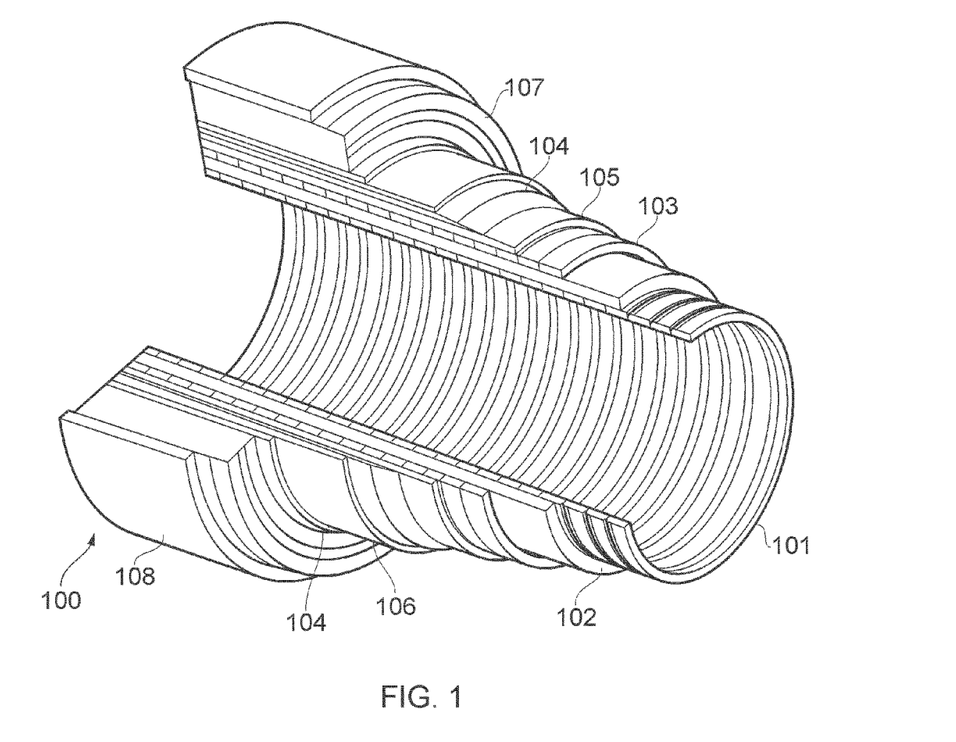
FIG. 1 illustrates flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including one or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and/or tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer than ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with elements having a lay angle close to 90° that increases the resistance of the flexible pipe to internal and external pressure and mechanical crushing loads. The layer also structurally supports the internal pressure sheath, and is typically of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers 104 of tape which each help contain underlying layers and may act as a sacrificial wear layer to help prevent abrasion between adjacent layers.

The flexible pipe body also typically includes optional layers of insulation 107 and an outer sheath 108, which comprises a polymer layer used to help protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1, are terminated in the end fitting in such a way as to transfer the load between the flexible pipe and the connector.

Figure 2:
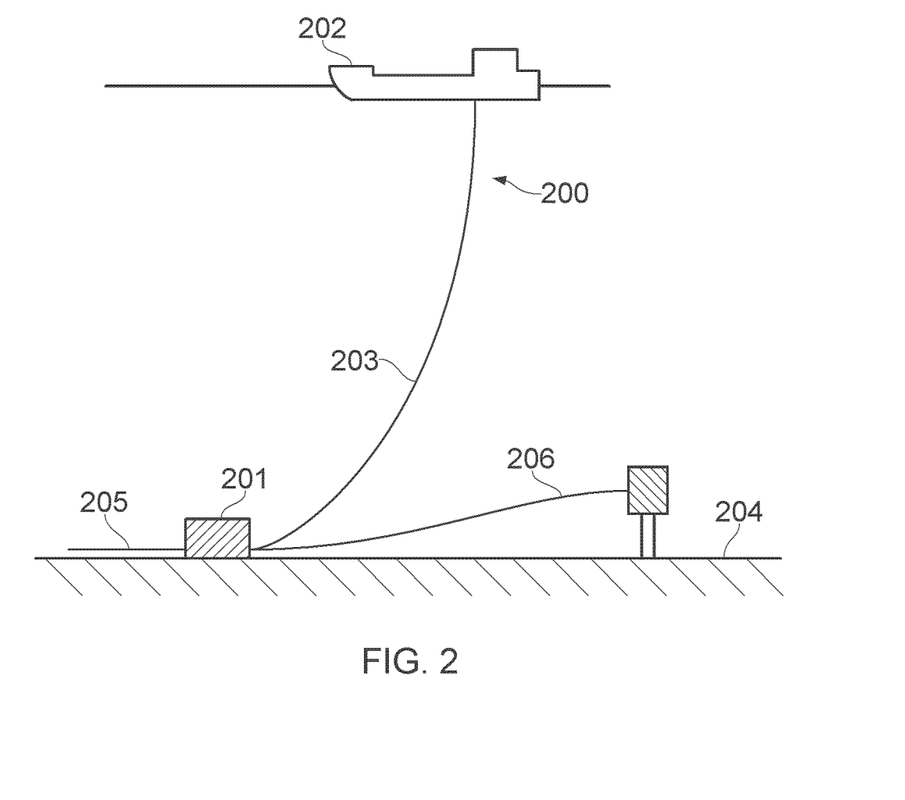
FIG. 2 illustrates uses of a flexible pipe.

FIG. 2 illustrates a riser assembly 200 suitable for transporting production fluid such as oil and/or gas and/or water from a sub-sea location 201 to a floating facility 202. For example, in FIG. 2 the sub-sea location 201 includes an end of a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be a single section or segments of flexible pipe body with end fittings connected end-to-end.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes). FIG. 2 also helps illustrate how portions of flexible pipe can optionally be utilised as a flow line 205 or jumper 206.

Figure 3:
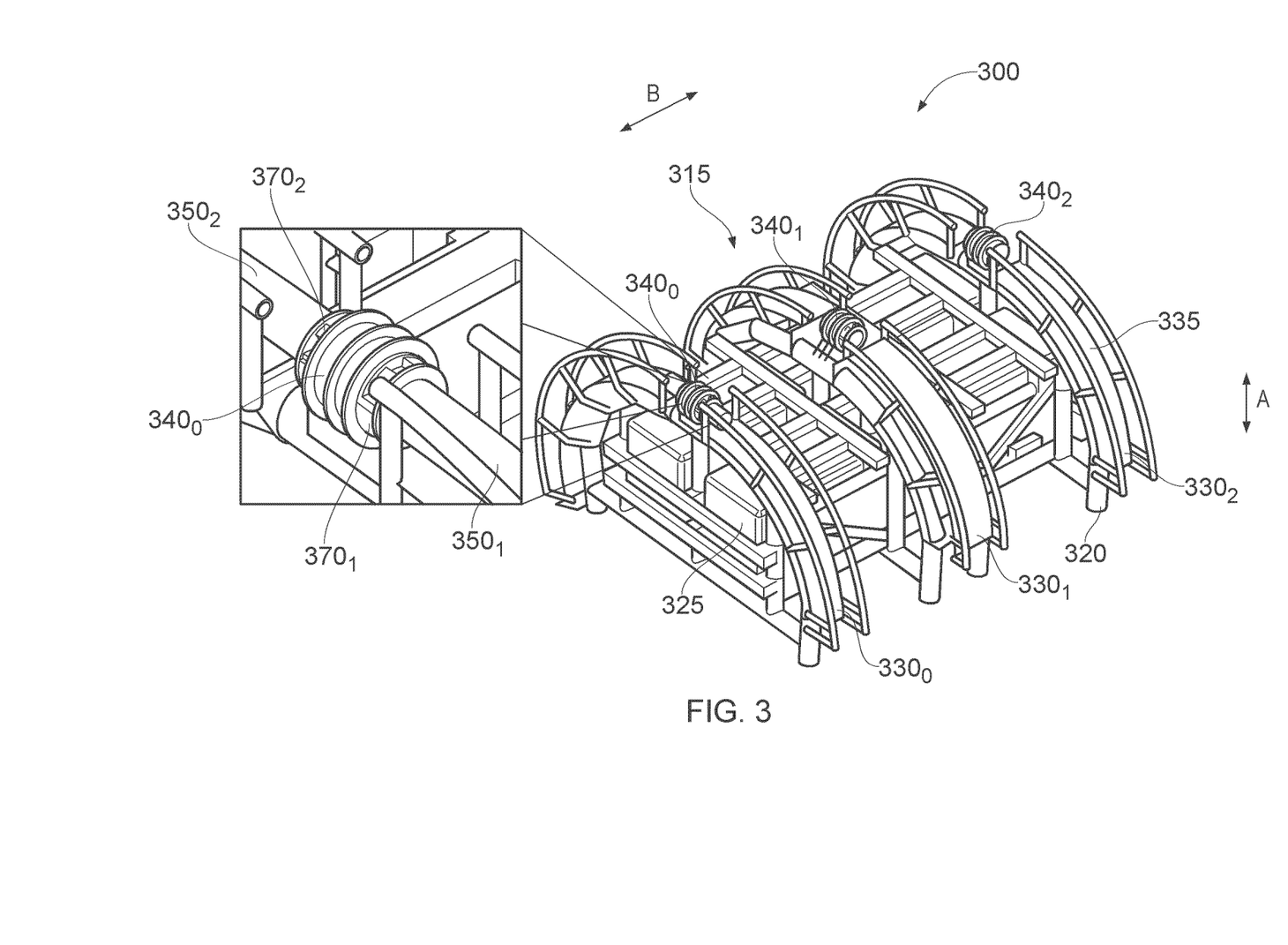
FIG. 3 illustrates clamps on a buoyancy support that may act as a wear hazard.

FIG. 3 illustrates a subsea arch 300 which helps illustrate a wear hazard 310 which a flexible pipe can be protected from according to certain embodiments of the present invention. The subsea arch 300 includes an arch structure 315 which is a rigid steel framework 320 within which multiple buoyancy units 325 are located. It will be appreciated by those skilled in the art that flexible pipe in the form of risers may be laid over the curved back of the arch in gutters $330_0$, $330_1$, $330_2$. The gutters 330 each include a curved support surface 340 which supports a flexible pipe and prevents the minimum bend radius (MBR) of a flexible pipe from being violated in use. Each gutter 330 is associated with a respective clamp $340_0$, $340_1$, $340_2$ which secures a flexible pipe in a fixed location with respect to the subsea arch 300 at an apex of the arch or other such location. It will be appreciated by those skilled in the art that a mooring system and anchor base are also utilised to locate the subsea arch at a desired location between the seabed and sea surface.

Each clamp 340 bears on the outer surface of the outer sheath 108 of a flexible pipe resting in a respective gutter associated with the clamp. Lifting forces potentially act on one or more ends of the flexible pipe in a direction illustrated by arrow A in FIG. 3. Lateral forces potentially act on one or more ends of each flexible pipe in a direction shown by arrow B in FIG. 3. As a result, when a flexible pipe is resting in a gutter and clamped rigidly to the subsea arch, part of, or all of the support surface 340 in the gutter 330 acts as a wear hazard 310. Without the protection afforded by certain embodiments of the present invention, as the outer sheath and metallic support surface rub together repeatedly, this could, over time, abrade the outer sheath of a flexible pipe located in the gutter. According to certain embodiments of the present invention a protective sleeve 350 is secured to each clamp 340 and located between the pipe and the wear hazard to thereby avoid such fatigue. In FIG. 3, a first protective sleeve $350_1$ and further protective sleeve $350_2$ are illustrated secured in a back-to-back relationship with respect to the clamp $340_0$ at the left hand side end of the subsea arch structure 300. The sleeves are each connected to the clamp via a respective connector $370_1$, $370_2$. It will be appreciated that only one protective sleeve could optionally be secured to a clamp on one side of the clamp where particular forces are expected which would otherwise cause substantial rubbing. Likewise, each clamp on an arch may include protective sleeves on none, one or both sides.

Figure 4:
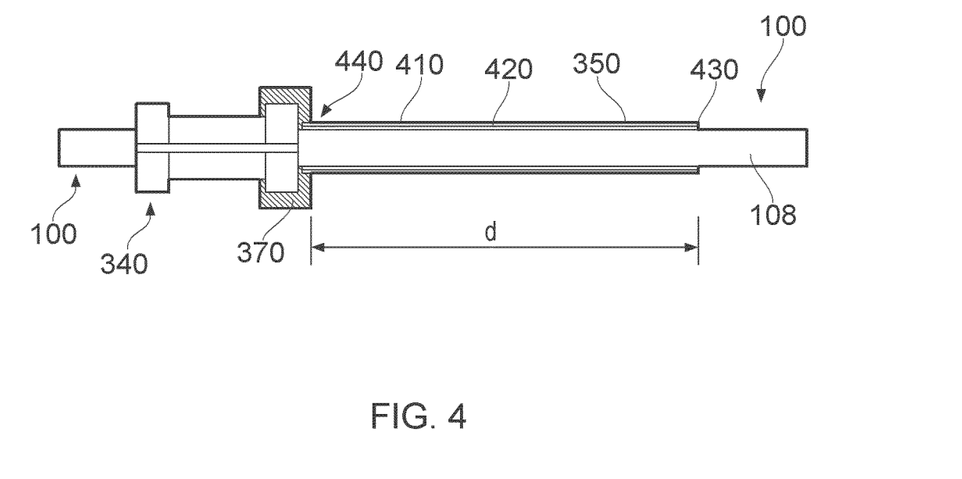
FIG. 4 illustrates the attachment of a protective sleeve to a clamp.

FIG. 4 illustrates another view of how a flexible pipe 100 may be secured to a clamp 340 on a subsea arch so that a protective sleeve 350 is located uncovered over a portion of an outer sheath 108 of the flexible pipe 100. The sleeve body is secured between the outer sheath 108 and a wear hazard 310 near to the flexible pipe. For example, the wear hazard 310 illustrated with respect to FIGS. 3 and 4 is the support surface 335 of a gutter of the subsea arch 300 over which a flexible pipe is draped.

The protective sleeve 350 of the embodiment illustrated in FIG. 4 is a sleeve which has an outer surface 410 and an inner surface 420. Both the outer surface and inner surface of the sleeve is substantially smooth and cylindrical and the sleeve itself is a unitary piece having a common cross-sectional thickness and stiffness. A cross-section along a whole length of the sleeve is substantially circular. The inner surface 420 has an inner diameter equal to (or optionally slightly larger than) the outer diameter of the sheath 108 of the flexible pipe. The sleeve thus entirely surrounds the flexible pipe over a distance d which extends from a free end 430 of the sleeve to a further end 440 of the sleeve where the sleeve is secured to an intermediate connector 370.

By securing the sleeve to the intermediate connector 370 and by then connecting that intermediate connector 370 to the clamp 340 the sleeve can be fixedly secured with respect to the rigid clamp to thereby locate the sleeve at a desired position over the pipe and between the outer surface of the flexible pipe and an adjacent wear hazard such as the support surface which would otherwise rub against the flexible pipe. Aptly, the protective sleeve can be removably secured to the clamp. The length d of protective sleeve is selected so that a portion of the flexible pipe is protected where rubbing and/or cutting forces are expected. The material and thickness of the outer sleeve are selected so that the bending stiffness of the portion of flexible pipe covered by the sleeve has a substantially similar stiffness to the remainder of the flexible pipe. By just providing a protective sleeve where a wear hazard is expected rather than by providing a further sleeve layer along the whole length of a flexible pipe, manufacturing costs can be much reduced.

Figure 5A:
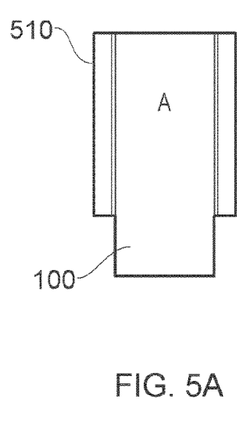
FIGS. 5A-C illustrate different types of sleeve bodies.
Figure 5B:
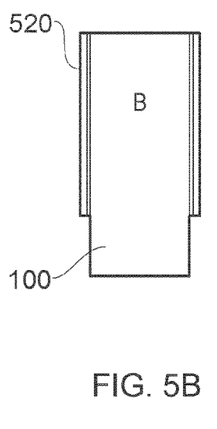
Figure 5C:
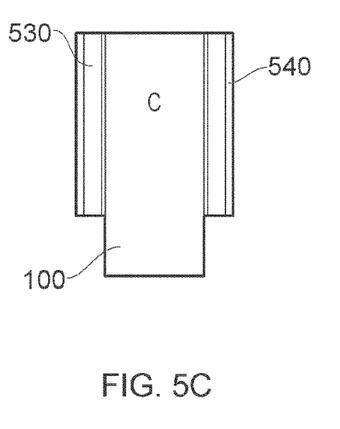

FIGS. 5A-C illustrate various options for a sleeve. In option A shown in FIG. 5A a polymeric layer 510 is utilised. The polymeric layer is used as a sacrificial layer. The wear resistance of the flexible pipe outer sheath 108 and wear resistance of the material of the sleeve 510 are selected so that the wear resistance of the outer sheath 108 is greater than that of the polymer used in sleeve manufacture. This configuration is advantageous where a significant axial displacement between the flexible pipe and the protective sleeve are expected. Effectively, this occurs when either the sleeve or outer sheath remains relatively motionless and the other slides lengthways with respect to it. The thickness of the sleeve 510 is relatively thick. Aptly, the thickness is about around 5 to 20 mm. This is because the protective sleeve acts as a sacrificial layer, continually abrading in preference to abrasion of the outer sheath of the flexible pipe 100.

FIG. 5B illustrates a further option which includes a relatively thin sleeve 520 of wear resistant material. Aptly, the material of the protective sleeve 520 is a composite material. Use of such an option as the protective sleeve is particularly suitable in situations where no axial displacement is expected between the pipe and the protective sleeve. For example, this is expected where a sleeve is connected to the end fitting of a pipe or secured to a clamp secured on the pipe. Aptly, the wear resistant sleeve could be relatively thin. Aptly, the thickness is about around 1 to 8 mm.

FIG. 5C illustrates a third alternative protective sleeve which is a hybrid and utilises a dual-layer system including an innermost relatively soft material layer 530 and an outermost wear resistant layer 540. This configuration is advantageous when the relative movement of the pipe in relation to a rigid structure is expected to be significant and axial displacement of the pipe in relation to the sleeve is also expected to be significant or combined with impact loading between the pipe and the proximate hazard. Aptly, more than two layers can be utilised with each layer being made of a material and having a thickness selected to minimise damage to the outer sheath over time.

Aptly, the inner, softer layer is made from a polyurethane or a thermoplastic elastomer, or a silicone rubber, and the outer layer is manufactured from fibre reinforced composite material, steel tape windings, or polytetrafluoroethylene (PTFE) or other suitably polymer impregnated windings of tape, reinforced with steel cords, or another solid high Shore D hardness polymer or polymer alloy layer such as a different grade of polyurethane to that utilised for the innermost layer.

The embodiments described with respect to the preceding figures all enable a protective sleeve to be located over an outer sheath of a flexible pipe prior to terminating the flexible pipe with end fittings and then securing the flexible pipe in situ to a rigid structure. The sleeve is slidably fitted over the outer sheath of the flexible pipe during manufacture and may then be slid to a desired location where a wear hazard exists and connected to an intermediate connector which is then secured to a rigid structure.

Aptly, the sleeve can have securing elements moulded or otherwise incorporated into at least one end of its length, such elements being securable behind or into or under sections or retaining features in the intermediate connector.

Figure 6:
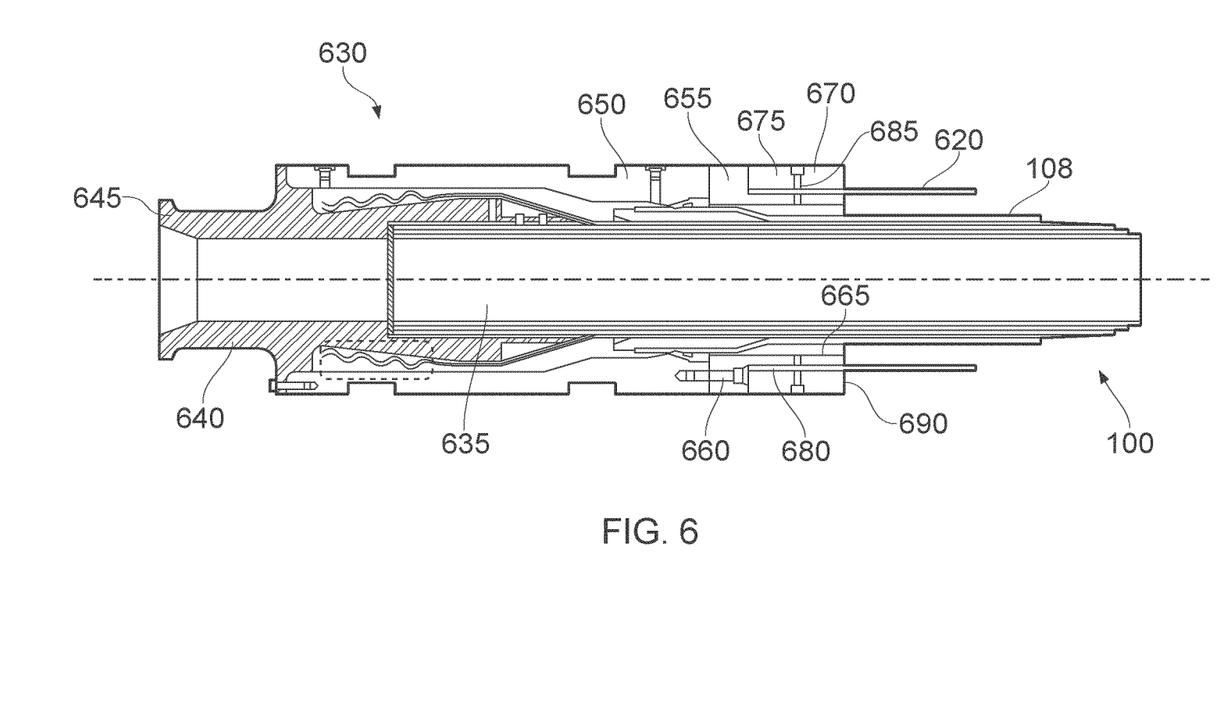
FIG. 6 illustrates attachment of a protective sleeve to an end fitting.

FIG. 6 illustrates an alternative embodiment of the present invention in which a protective sleeve 620 can be secured to an end fitting 630 used to terminate an end 635 of the flexible pipe body of a flexible pipe. The end fitting 630 has an end fitting body 640 which has a flange 645 at a first end thereof for securing the flexible pipe to a further structure in a conventional manner. A remaining end of the end fitting body 640 defines an open mouth which receives one or more layers of the flexible pipe body. An outer jacket 650 of the end fitting surrounds the end fitting body and stripped away layers of the flexible pipe are terminated within this jacket. An open collar 655 is secured via bolts 660 or other such recurring element to an end of the jacket. The collar has a cylindrical bore defined by an inner surface 665 of the collar and is substantially L-shaped in cross-section. A ring 670 extends over the recessed (or cut out) region of the collar 655 and an end of the protective sleeve 620 is sandwiched between a radially innermost surface 675 of the ring 670 and a radially outermost surface 680 of the collar 655. Securing bolts 685 or other such securing elements are utilised to secure the ring 670 to the collar 655 and securely sandwich the end of the sleeve 620 therebetween. The remaining section of the sleeve 620 extends away from the end fitting towards a free end (not shown). The sleeve body is thus secured to the end fitting whereby the sleeve body is secured uncovered over a region of the outer sheath of flexible pipe 100 from an end of the end fitting defined by an end of the ring 670 and end of the collar 655 to a free end of the protective sleeve. The sleeve shown in FIG. 6 looks quite short but is shown truncated for clarity. Aptly, the sleeve extends uncovered 1-30 m from the end fitting. Aptly, the sleeve extends 3-20 m from the end fitting. Aptly, the sleeve can have securing elements moulded or otherwise incorporated into at least one end of its length, such elements being securable behind or into clamping or retaining features in the end fitting.

Aptly, instead of providing the outer sleeve at the time of manufacturing the flexible pipe and before terminating flexible pipe body with an end fitting certain embodiments of the present invention can utilise a protective sleeve that can be retrofitted to an in situ flexible pipe. For example, the sleeve body may, instead of being a whole cylindrical sleeve, instead be slit along its length. This enables the sleeve to be opened by pulling opposed sections of the sleeve body apart where the slit is provided and then thrusting the flexible pipe through the open mouth formed between the parts of the sleeve body that are drawn apart. The sleeve body may then be closed around the outer sheath of the flexible pipe and secured either to an intermediate connector or connector that can be secured to an end fitting as described hereinabove.

Figure 7:
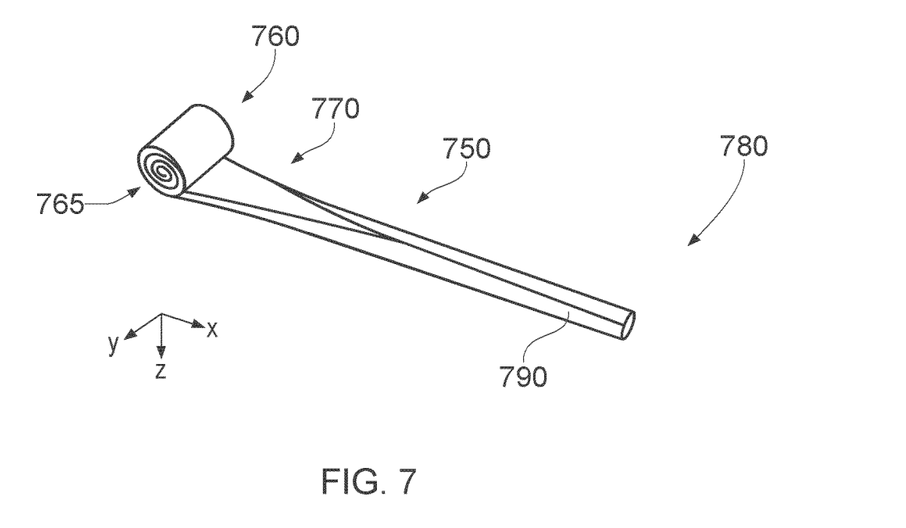
FIG. 7 illustrates a protective sleeve made from bi-stable material.

FIG. 7 illustrates an alternative embodiment of the present invention which can be retrofitted to a flexible pipe at a location where a wear hazard is located. More particularly, FIG. 7 illustrates a sleeve body 750 which can be utilised to protect, in an uncovered state, a region of a flexible pipe. The body 750 of the sleeve is manufactured from a bi-stable composite material. Such materials can be pre-stressed so that they wish to roll up into a rigid round tube structure when unfurled from a flat coiled state. FIG. 7 illustrates how an end 760 of the sleeve body is arranged in a flat coiled state in a coil 765. An intermediate region 770 of the sleeve occurs where the material is unfurled from the coil. A remaining end 780 shows how the material rolls up naturally into a rigid round tube 790.

Figure 8:
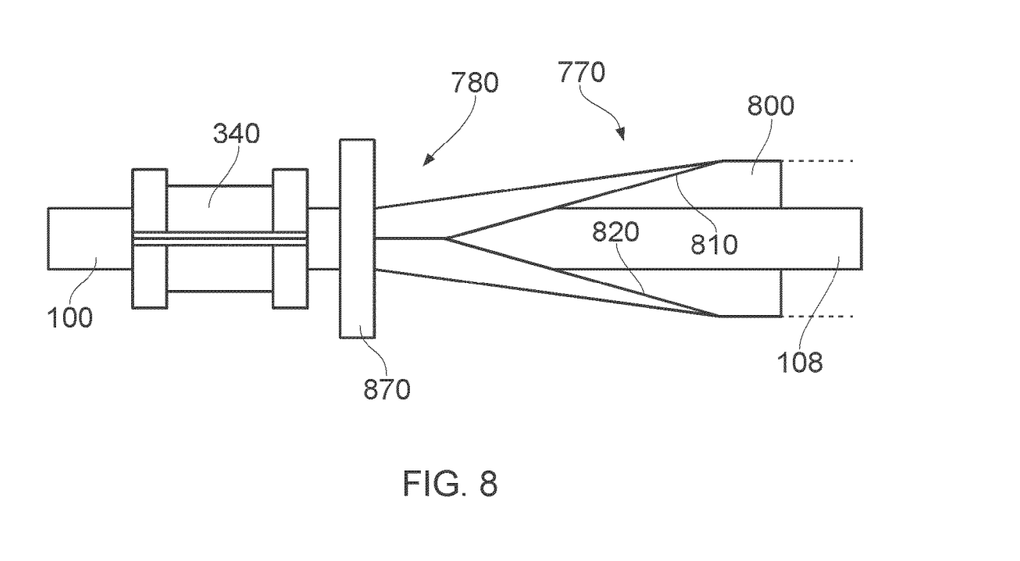
FIG. 8 illustrates an end of the bi-stable sleeve shown in FIG. 7 secured to an intermediate connector.

FIG. 8 illustrates how a sleeve manufactured from such a bi-stable composite material can be utilised to provide a protective sleeve according to an embodiment of the present invention and how this can be retro-fitted in situ to a flexible pipe 100. The sleeve, in use, would be carried in its flat coiled state to a location where the flexible pipe is experiencing or is likely to experience abrasion from a wear hazard. The wound coil of sleeve material would gradually be unfurled from the coil located proximate to the outer sheath 108 of the flexible pipe 108 where required. As the material is unfurled, it leaves the coil in a flat state region 800 and then begins to roll into a round tube. As this occurs, opposed edges 810, 820 of the sleeve body roll together towards each other. As this occurs, the sleeve body embraces and envelopes the outer sheath 108 of the flexible pipe. The width of the sleeve is selected so that the sleeve just rolls around the outer sheath. Alternatively, the width is oversized so that one edge overlaps the other when rolled into the round tube state. Alternatively, the width is undersized so that the edges remain spaced apart when wrapped around the outer sheath of the pipe. The end 780 of the sleeve body is secured in a tightly rolled configuration to an intermediate connector 870. This can then be secured to a clamp 340 (or end fitting or other rigid structure) as desired.

Figure 9A:
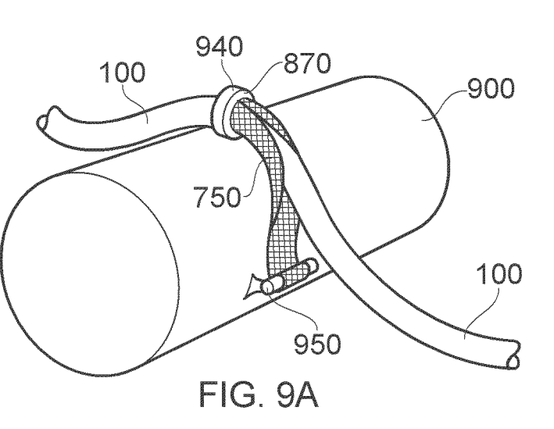
FIGS. 9A-B illustrate the bi-stable sleeve protecting a flexible pipe from a wear hazard.
Figure 9B:
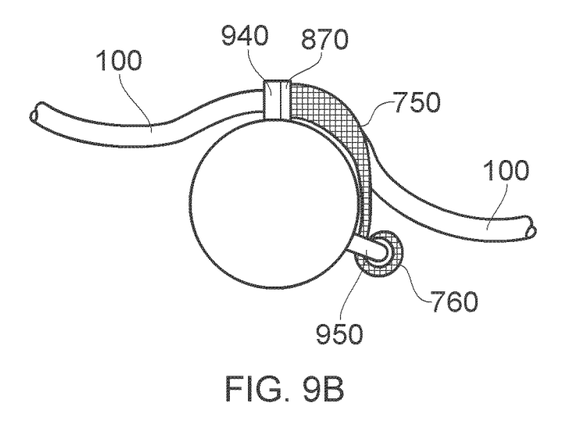

FIGS. 9A-B illustrate how the protective sleeve 750 illustrated in FIGS. 7 and 8 is secured around a flexible pipe 100 which itself is draped over a buoyancy element 900. The flexible pipe is secured to the buoyancy element 900 by a clamp 940 to prevent axial motion of the flexible pipe with respect to the buoyancy element 900. An intermediate connector 870 is secured to an end 780 of the bi-stable sleeve body 750 and then secured to the clamp 940. A remaining end of the sleeve body remains in a coil 765 which is rotatably mounted to a support 950 which is securely fastened to the buoyancy element 900. By first securing the coil to the support 950 the sleeve material can easily be unfurled from the coil towards the clamp area. It will be appreciated that according to certain other embodiments of the present invention a whole length of a bi-stable sleeve body can be utilised in its rolled state so that the whole sleeve body is rolled around the outer sheath 108 of a flexible pipe. As such, there would be no need for the support 950 to be provided to support a coiled end of the sleeve, although this could optionally still be provided to assist during the unfurling stage.

It will be appreciated that whilst many of the described embodiments have been discussed in respect of a wear hazard provided by a man-made object, certain other embodiments of the present invention are broadly applicable to the use of a protective sleeve to cover a portion of a flexible pipe where any type of wear hazard may be located. In this sense, a wear hazard is any body or part or feature which could potentially rub or cut a flexible pipe during the lifetime of the flexible pipe. This is possible when relative motion between the flexible pipe and the object causing the wear hazard occurs. For example, the flexible pipe may tend to rub or knock against a nearby object. The wear hazard may be a rocky seabed region or riser touchdown location or clash area or pipeline crossing zone or contact surface on a buoyancy element or the like. The wear hazard could thus be a natural or manmade body.

Certain embodiments of the present invention provide a modular and local solution for wear related problems associated with flexible pipes. As an example, certain embodiments of the present invention can be utilised to protect flexible risers installed in mid-water floating devices such as MWAs with no impact to the design of the flexible pipe structure.

Certain embodiments of the present invention avoid the use of additional sacrificial layers along a whole length of the flexible pipe. They thus have little impact on the bending stiffness of the structure and on overall cost.

Certain embodiments of the present invention can utilise bi-stable composite technology to allow retro-fitting to flexible pipes already in service with a minimum intervention to the overall operating system.

Certain embodiments of the present invention can use a dual-layer system for the manufacture of a protective sleeve. This allows the protection of a flexible pipe outer sheath with the use of a soft material in an innermost layer and reduces overall wear rates with the use of a highly wear resistant material in an outer surface.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for protecting an outer sheath of a flexible pipe, comprising:
   a protective sleeve body comprising a first end region and a further end region; and
   at least one connector element securable to the first end region for securing the sleeve body with respect to a flexible pipe located proximate to a wear hazard; wherein
   the sleeve body is securable uncovered over a portion of an outer sheath of the flexible pipe between said outer sheath and said wear hazard, to provide a protected portion of flexible pipe having a bending stiffness substantially equal to a bending stiffness of a remaining portion of the flexible pipe uncovered by said sleeve body; and
   wherein the connector element comprises an intermediate connector connectable to a friction clamp secured to the flexible pipe.

2. The apparatus as claimed in claim 1 wherein an outer surface and an inner surface of the sleeve body are substantially smooth and cylindrical.

3. The apparatus as claimed in claim 1 wherein the sleeve body is a unitary element having a common cross-sectional thickness and stiffness and substantially circular cross-section along a whole length of the sleeve body.

4. The apparatus as claimed in claim 1 wherein an opening extends through the sleeve body between a first and further end of the sleeve body.

5. The apparatus as claimed in claim 1 wherein the sleeve body comprises a single sacrificial layer of a material that abrades before the outer sheath is abraded as the flexible pipe is axially or laterally displaced with respect to the sleeve body.

6. The apparatus as claimed in claim 5 wherein the sacrificial layer is a polymeric layer.

7. The apparatus as claimed in claim 1 wherein the sleeve body is a single layer of wear resistant material that resists abrasion by the wear hazard when the flexible pipe is repeatedly urged against the wear hazard.

8. The apparatus as claimed in claim 7 wherein the material of the wear resistant layer has a composite construction.

9. The apparatus as claimed in claim 1 wherein the protective sleeve body is a multi-layer body comprising an inner sacrificial layer, that abrades before the outer sheath is abraded as the flexible pipe is axially or laterally displaced with respect to the sleeve body, and an outer wear resistant layer that resists abrasion by the wear hazard when the flexible pipe is repeatedly urged against the wear hazard.

10. The apparatus as claimed in claim 1 wherein the sleeve body is a strip of bi-stable material.

11. The apparatus as claimed in claim 10, further comprising:
the strip has a first state in which the material is curled about a rolling axis perpendicular to a longitudinal axis of the strip and a further state in which the material is wrapped around a clamping axis substantially parallel with the longitudinal axis.

12. The apparatus as claimed in claim 11, further comprising:
the sleeve body is selectively extendable into the further state in which the strip is wrapped circumferentially around the pipe.

13. The apparatus as claimed in claim 1, further comprising:
the flexible pipe is a riser or jumper.

14. The apparatus as claimed in claim 1, further comprising:
the wear hazard is a rocky seabed or riser touchdown location or clash area or pipeline crossing zone or contact surface of a buoyancy member.

15. A method of protecting an outer sheath of a flexible pipe, comprising the steps of:
via at least one connector element, securing a protective sleeve body over a portion of an outer sheath of a flexible pipe located proximate to a wear hazard to provide a protected portion of the flexible pipe where the sleeve body is located between the outer sheath and the wear hazard, wherein said protected portion has a bending stiffness substantially equal to a bending stiffness of a remaining portion of the flexible pipe uncovered by said sleeve body, wherein said step of securing the sleeve body comprises securing an intermediate connector element to a friction clamp secured to the flexible pipe and securing the sleeve body to the intermediate connector element.

16. The method as claimed in claim 15, further comprising the step of:
providing a multi-layer sleeve body comprising at least an inner sacrificial layer and an outer wear resistant layer.

17. The method as claimed in claim 15, further comprising the step of:
retro-fitting the sleeve body to an in-situ flexible pipe.

18. The apparatus as claimed in claim 1, wherein the sleeve body comprises one or more securing elements at the first end region to secure the sleeve body to the intermediate connector.

* * * * *